United States Patent
Rao et al.

(10) Patent No.: US 11,994,575 B2
(45) Date of Patent: May 28, 2024

(54) FREQUENCY MODULATED CONTINUOUS WAVE RADAR SYSTEM WITH INTERFERENCE MITIGATION

(71) Applicant: Texas Instruments Incorporated, Dallas, TX (US)

(72) Inventors: Sandeep Rao, Bengaluru (IN); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 433 days.

(21) Appl. No.: 17/478,312

(22) Filed: Sep. 17, 2021

(65) Prior Publication Data
US 2022/0120886 A1   Apr. 21, 2022

(30) Foreign Application Priority Data
Oct. 16, 2020   (IN) ............................. 202041045051

(51) Int. Cl.
  *G01S 13/34*   (2006.01)
  *G01S 7/02*    (2006.01)
  *G01S 7/35*    (2006.01)

(52) U.S. Cl.
  CPC .............. *G01S 13/34* (2013.01); *G01S 7/021* (2013.01)

(58) Field of Classification Search
  None
  See application file for complete search history.

(56) References Cited

U.S. PATENT DOCUMENTS

| 8,471,760 B2 * | 6/2013 | Szajnowski | G01S 7/023 |
| | | | 342/107 |
| 10,502,824 B2 * | 12/2019 | Roger | G01S 7/023 |
| 10,855,328 B1 * | 12/2020 | Gulati | G01S 7/0234 |

(Continued)

FOREIGN PATENT DOCUMENTS

| CN | 107064881 A * | 8/2017 | ........... G01S 13/282 |
| EP | 2189809 A1 * | 5/2010 | ........... G01S 13/347 |

(Continued)

OTHER PUBLICATIONS

International Search Report and Written Opinion for International Patent Application No. PCT/US 2021/055356, dated Dec. 29, 2021, 7 pages.

*Primary Examiner* — Vladimir Magloire
*Assistant Examiner* — Brandon James Henson
(74) *Attorney, Agent, or Firm* — Michael T. Gabrik; Frank D. Cimino

(57) ABSTRACT

A method for dithering radar frames includes determining at least one of a chirp period Tc for radar chirps in a radar frame and a chirp slope S for radar chirps in the radar frame. In response to determining the chirp period Tc, a maximum chirp dither $\Delta c(max)$ is determined, and for the radar frame N, a random chirp dither $\Delta c(N)$ between negative $\Delta c(max)$ and positive $\Delta c(max)$ is determined. In response to determining the chirp slope S, a maximum slope dither $\Psi(max)$ is determined, and for the radar frame N, a random slope dither $\Psi(N)$ between negative $\Psi(max)$ and positive $\Psi(max)$ is determined. A radar sensor circuit generates radar chirps in the radar frame N based on the at least one of (1) the chirp period Tc and the random chirp dither $\Delta c(N)$ and (2) the chirp slope S and the random slope dither $\Psi(N)$.

25 Claims, 7 Drawing Sheets

(56) References Cited

U.S. PATENT DOCUMENTS

| | | | |
|---|---|---|---|
| 11,513,187 B2 * | 11/2022 | Stettiner | ................ G01S 13/931 |
| 11,520,003 B2 * | 12/2022 | Stettiner | ................. H04B 1/715 |
| 11,585,889 B2 * | 2/2023 | Gulati | ................. H04J 13/0062 |
| 2018/0252797 A1 * | 9/2018 | Frick | ..................... G01S 13/343 |

FOREIGN PATENT DOCUMENTS

| RU | 2688921 C2 | 5/2019 |
|---|---|---|
| WO | 2019215733 A1 | 11/2019 |

* cited by examiner

FREQUENCY MODULATED CONTINUOUS WAVE RADAR SYSTEM WITH INTERFERENCE MITIGATION

CROSS-REFERENCE TO RELATED APPLICATIONS

This application claims priority to India Provisional Application No. 202041045051, filed Oct. 16, 2020, which is hereby incorporated by reference.

BACKGROUND

Many driving assistance systems implement frequency modulated continuous wave (FMCW) radar systems to aid in collision warning, blind spot warning, lane change assistance, parking assistance, and rear collision warning. The basic transmit signal of FMCW radar is a frequency ramp, also commonly known as a "chirp." A chirp is a signal whose frequency varies linearly with time. For example, a millimeter wave radar system might transmit a chirp with a 4 GigaHerz (GHz) bandwidth that starts at 77 GHz and linearly increases to 81 GHz. The transmitted chirp reflects off one or more objects, and the reflected signal is received at one or more receiver antennas. An FMCW radar system transmits a series of these equally spaced chirps in a unit called a frame. The reflected signal is down-converted, digitized and then processed to obtain the range, velocity, and angle of arrival for objects in front of the radar system.

As the prevalence of radar systems in automotive, manufacturing, and other contexts increases, the likelihood of interference between radar systems increases as well. One technique to reduce or mitigate radar interference is to dither the intra-frame chirp timing across chirps in a radar frame. However, intra-frame chirp dithering can increase the noise floor of the radar system and reduce the detection sensitivity for weak target objects.

SUMMARY

An apparatus includes one or more processors and one or more non-transitory computer-readable media storing machine instructions. The machine instructions, when executed by the one or more processors, cause the one or more processors to determine at least one of a chirp period Tc for radar chirps in a radar frame and a chirp slope S for radar chirps in the radar frame. In response to determining the chirp period Tc, the processors determine a maximum chirp dither $\Delta c(max)$ and for a radar frame N, a random chirp dither $\Delta c(N)$ between negative $\Delta c(max)$ and positive $\Delta c(max)$. In response to determining the chirp slope S, the processors determine a maximum slope dither $\Psi(max)$ and for the radar frame N, a random slope dither $\Psi(N)$ between negative $\Psi(max)$ and positive $\Psi(max)$. The processors then cause a radar sensor circuit to generate radar chirps in the radar frame N based on the at least one of (1) the chirp period Tc and the random chirp dither $\Delta c(N)$, and (2) the chirp slope S and the random slope dither $\Psi(N)$. In some implementations, the apparatus further comprises the radar sensor circuit.

In some implementations, the chirp period Tc for the radar chirps is determined based on a threshold unambiguous velocity, and the maximum chirp dither $\Delta c(max)$ is based on a threshold deviation from the threshold unambiguous velocity. In some implementations, the chirp slope S is based on a frequency range of the radar chirps, a threshold range resolution, and the chirp period Tc, and the maximum slope dither $\Psi(max)$ is based on a threshold deviation from the threshold range resolution.

In some implementations, the non-transitory computer-readable media further comprise machine instructions which cause the processors to determine a period TF for the radar frame and a maximum frame dither $\Delta F(max)$. For the radar frame N, the processors determine a random frame dither $\Delta F(N)$ between negative $\Delta F(max)$ and positive $\Delta F(max)$ and further generate the radar frame N based on the period TF and the random frame dither $\Delta F(N)$. In some implementations, the period TF for the radar frame is based on an update rate and the maximum frame dither $\Delta F(max)$ is based on a threshold deviation from the update rate.

In some implementations, the non-transitory computer-readable media further comprise machine instructions which cause the processors to determine a subsequent radar frame dither $\Delta F(N+1)$ between negative $\Delta F(max)$ and positive $\Delta F(max)$ for a subsequent radar frame N+1. The processors cause the radar sensor circuit to generate the subsequent radar frame N+1 based on the period TF and the subsequent random frame dither $\Delta F(N+1)$. The subsequent random frame dither $\Delta F(N+1)$ is not equal to the random frame dither $\Delta F(N)$, in some implementations.

In some implementations, the non-transitory computer-readable media further comprise machine instructions which cause the one or more processors to determine, for a subsequent radar frame N+1, at least one of a subsequent random chirp dither $\Delta c(N+1)$ between negative $\Delta c(max)$ and positive $\Delta c(max)$ and a subsequent random slope dither $\Psi(N)$ between negative $\Psi(max)$ and positive $\Psi(max)$. The processors cause the radar sensor circuit to generate radar chirps in the subsequent radar frame N+1 based on the at least one of (1) the chirp period Tc and the subsequent random chirp dither $\Delta c(N+1)$ and (2) the chirp slope S and the subsequent random slope dither $\Psi(N+1)$. In some implementations, the subsequent random chirp dither $\Delta c(N+1)$ is not equal to the random chirp dither $\Delta c(N)$ and the subsequent random slope dither $\Psi(N+1)$ is not equal to the random slope dither $\Psi(N)$.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

The disclosed radar systems implement inter-frame chirp dithering to mitigate interference from other radar systems. Inter-frame chirp dithering reduces the number of cells affected by the interfering signal in each particular range bin without introducing phase noise into the Doppler fast Fourier transform as intra-frame dithering does. In addition or alternatively, the radar systems can implement dithering in the period from the start of one radar frame to the start of another radar frame. In further addition or alternatively, the radar system can implement slope dithering to adjust the slope of the radar chirps from one radar frame to another radar frame.

Figure 1:
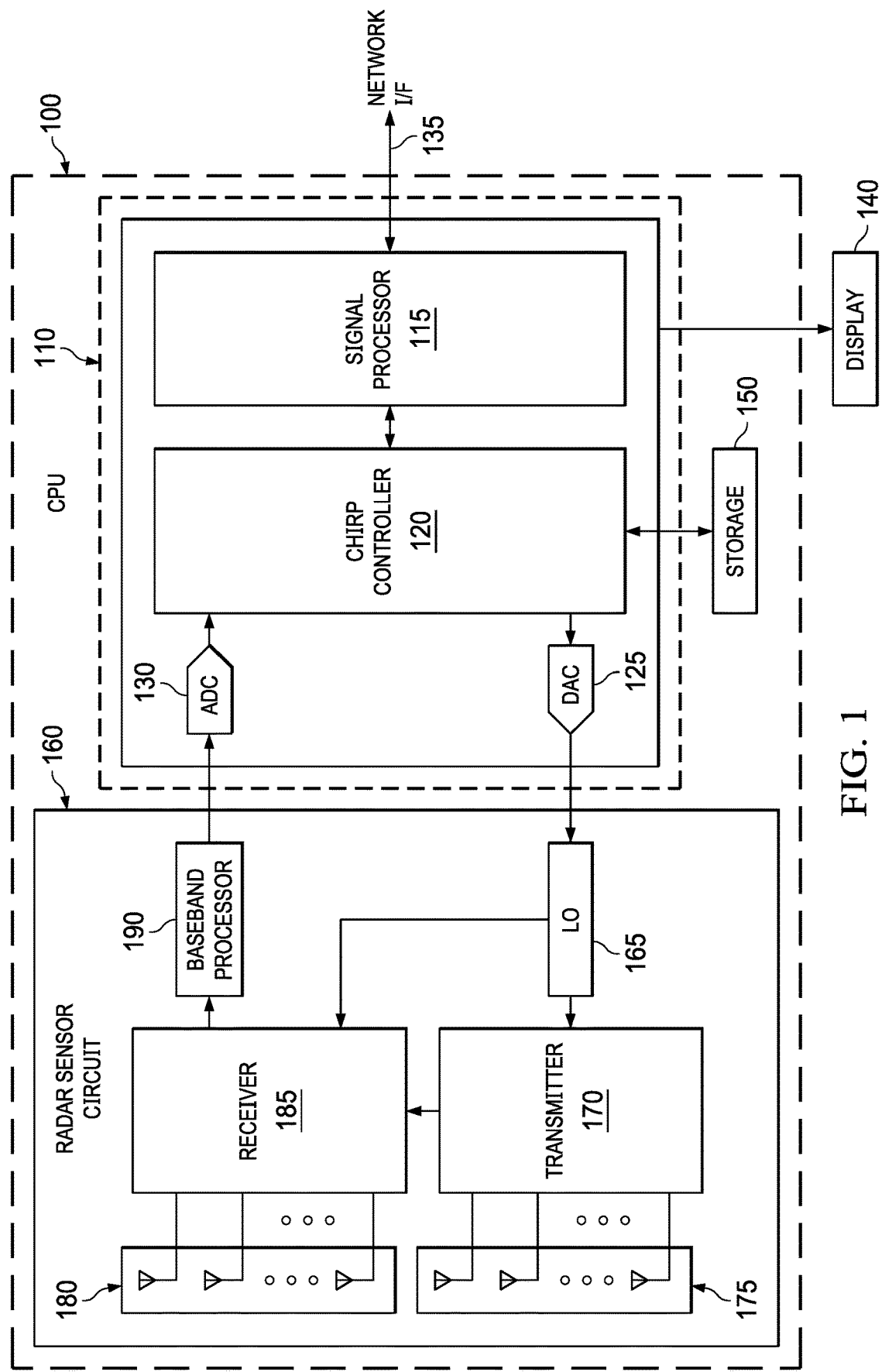
FIG. 1 shows a block diagram of an example radar system.

FIG. 1 shows a block diagram of an example radar system 100. Radar system 100 may be used in a vehicle, such as for a driver assistance system in an automobile. In this example, radar system 100 includes a radar sensor circuit 160, a central processor unit (CPU) 110, a display 140, and storage 150. Radar sensor circuit 160 includes a transmitter 170 that drives an antenna array 175 of one or more transmitter (TX) antennas. A receiver 185 receives signals from an antenna array 180 of one or more receiver (RX) antennas. A baseband processor 190 amplifies and filters the received signals that are reflected from objects in the path of the transmitted chirp signals. In this example radar system 100, transmitter 170 operates in the 77 GHz region and produces a frequency modulated continuous wave (FMCW) signal. The continuous wave signal is frequency modulated to form a series of chirps using a local oscillator (LO) 165. In example radar system 100, the TX antenna array 175 and RX antenna array 180 are stationary. In other examples, the antenna arrays may be configured to transmit and receive across a range of area, such as by mechanical movement.

FMCW radar, also referred to as continuous-wave frequency-modulated (CWFM) radar, is capable of determining distance, velocity, and angle of arrival. In a FMCW system, the transmitted chirp signal of a known stable frequency continuous wave varies up and down in frequency over a fixed period of time by a modulating signal. Received reflections are then mixed with the transmitted chirp signal to produce a received beat signal, which will give the distance, velocity, and angle of arrival for the target object after signal processing. Frequency differences between the received reflections and the transmitted chirp signal increase with delay and are therefore proportional to distance.

The phase differences between the received reflections across consecutive chirps allow the velocity of target objects to be computed. The phase differences between the received reflections at a first receiver antenna and the received reflections at a second receiver antenna allow the angle of arrival of target objects to be computed. Thus with an FMCW radar system, the distance between the target object and the radar system, relative velocity of the target object, relative angle of the target object and the like can be calculated.

During normal operation, linear frequency chirps are transmitted, and reflected signals are received. The receiver and transmitter are arranged as a homodyne system so that the received reflections are down-converted directly into the baseband in receiver 185 using a copy of the transmitted signal from LO 165. The baseband signals are then filtered and amplified by filters and variable gain amplifiers by baseband processor 190. After converting the baseband signals into the digital domain, time domain to frequency domain transforms such as fast Fourier transforms (FFTs) may be applied and other signal processing performed in order to determine the distance, velocity, and angle of arrival between the target object and the radar system 100. For example, the down-converted and digitized received signal corresponding to each chirp is first transformed using an FFT (called the range FFT). The range FFT produces a series of range bins with the value of each range bin denoting the signal strength of reflected targets at the corresponding range. A Doppler FFT is then performed for each range bin across all the chirps in a frame to estimate the velocities of reflected targets.

CPU 110 comprises one or more CPU cores, digital signal processors, application specific integrated circuits, and the like. The term "CPU" (singular) is used herein to refer to either a single or multiple CPU cores, and to broadly describe central processing units, digital signal processors, application specific integrated circuits, and the like. CPU 110 includes a chirp controller 120 that receives a stream of data from receiver antenna array 180 via an analog to digital converter (ADC) 130 and performs chirp generation and control of the transmitter via a digital to analog converter (DAC) 125. A varying voltage tuning control signal from DAC 125 is used to control LO 165. CPU 110 also includes a signal processor 115 that may perform signal processing for determining a velocity, an angle of arrival, distance between the target object and radar system 100, and the like.

Signal processor 115 can provide the determined values to display 140 and/or communicate with other systems via a network interface 135. Network 135 may include various combinations of local area networks (LANs), wide area networks (WANs), the internet and/or other known or later developed wired or wireless communication mechanisms, for example. Storage 150 may be used to store instructions and data received from antenna 180 or signal processor 115. Storage 150 may be any appropriate storage medium, such as a static random access memory (SRAM).

Figure 2A:
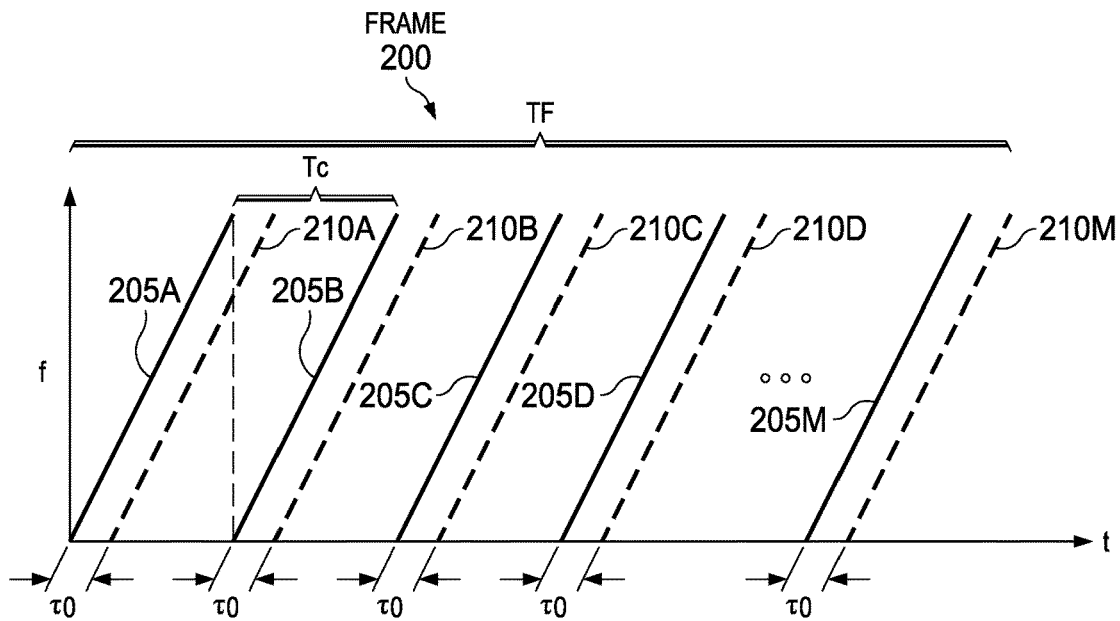
FIG. 2A illustrates waveforms of a frame of undithered chirp signals in accordance with an example.

FIG. 2A illustrates waveforms of undithered chirp signals 205 in accordance with an example. A frame 200 with a period TF includes a number M of undithered chirp signals 205 transmitted at equal intervals based on a chirp period Tc. An interfering radar system may have similar, interfering chirp signals 210A-M as the undithered chirp signals 205A-M, for example because the interfering radar system has the same manufacturer. With undithered chirp signals, each interfering chirp signal 210 has the same delay $\tau 0$ with respect to each corresponding undithered chirp signal 205.

Figure 2B:
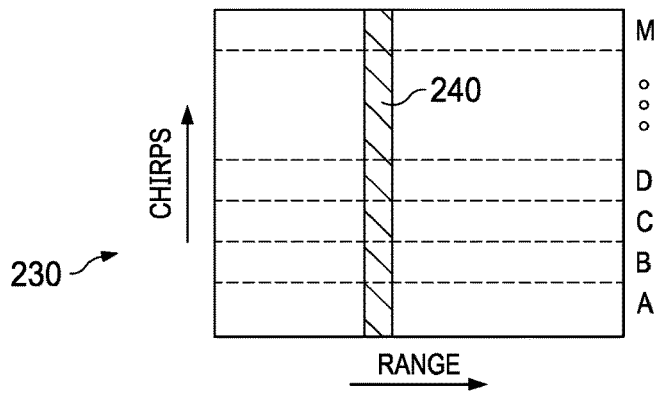
FIG. 2B illustrates an example representation of a range fast Fourier transform (FFT) for the undithered chirp signals in the frame shown in FIG. 2A.
Figure 2C:
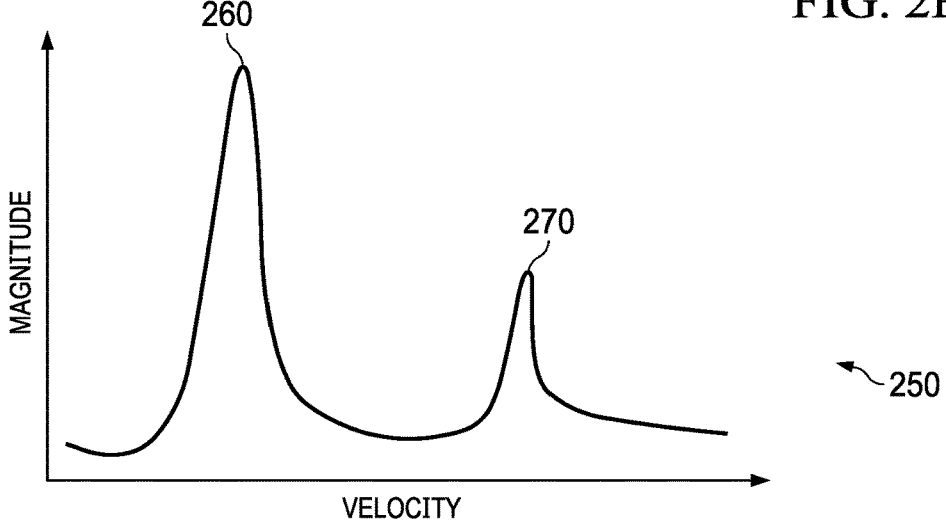
FIG. 2C illustrates a waveform of a Doppler FFT for the undithered chirp signals in the frame shown in FIG. 2A.

FIG. 2B illustrates an example representation 230 of a range FFT performed on the received signal corresponding to the transmission of the undithered chirp signals 205A-M shown in FIG. 2A. Performing an FFT on received data corresponding to each chirp 205 resolves the received radar reflections into range bins. In addition to reflections from the transmitted chirp signals 205A-M, the received signal also includes the interfering chirp signals 210A-M. Because the interfering signals 210A-M have the same delay τ0 with respect to the corresponding undithered chirp signal 205A-M, the interfering signals 210 appear as objects at a particular range bin 240. Any genuine radar reflections at the particular range bin 240 with a lower power than the interfering signals 210 are obscured. FIG. 2C illustrates a waveform 250 of a Doppler FFT performed on a range bin other than range bin 240 from the range FFT of the chirps 205 in frame 200 shown in FIG. 2A. The particular range bin does not include the interfering signals 210. Performing an FFT across range bin for the undithered chirps 205A-N in the frame 200 resolves radar reflections into velocity bins. With no timing dither, there is no corruption in phase across chirps 205A-M, and so both the strong target 260 and the weak target 270 are visible in the Doppler FFT.

Figure 3A:
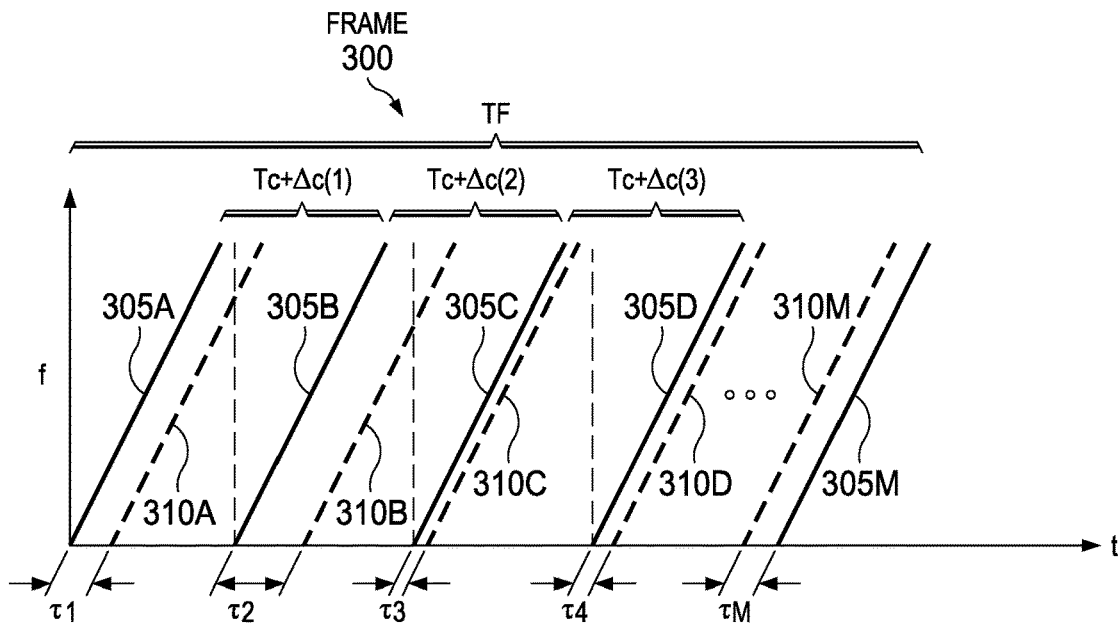
FIG. 3A illustrates waveforms of intra-frame dithered chirp signals in accordance with an example.

FIG. 3A illustrates waveforms of intra-frame dithered chirp signals 305 in accordance with an example. A frame 300 with a period TF includes a number M of dithered chirp signals 305 transmitted at different intervals. For example, a chirp period Tc and a first chirp dither Δc(1) are added together for a first interval between the start of a first chirp signal 305A to the start of a second chirp signal 305B. The chirp period Tc and a second chirp dither Δc(2) are added together for a second interval between the start of the second chirp signal 305B to the start of a third chirp signal 305C. Each chirp signal 305 in frame 300 may be associated with a unique chirp dither Δc, and another frame of chirp signals may have the same or different chirp dithers as frame 300. The duration of the chirp dither Δc can be five to ten percent of the chirp period Tc, in some implementations. Each radar system randomly and independently chooses the chirp dither Δc.

An interfering radar system may have similar, interfering chirp signals 310A-N as the intra-frame dithered chirp signals 305A-M, for example because the interfering radar system has the same manufacturer. The chirp dither Δc for the interfering chirp signals 310A-M is different from the chirp dither Δc for the chirp signals 305A-M because the radar system and the interfering radar system select the corresponding chirp dither Δc independently from each other. Hence with intra-frame dithered chirp signals, each interfering chirp signal 310 has a unique delay τ with respect to the corresponding intra-frame dithered chirp signal 305. For example, the interfering chirp signal 310A has a first delay τ1 with respect to the intra-frame dithered chirp signal 305A, while the interfering chirp signal 310B has a second delay τ2 with respect to the intra-frame dithered chirp signal 305B. As another example, the interfering chirp signal 310M precedes the intra-frame dithered chirp signal 305M by the delay τ(M).

Figure 3B:
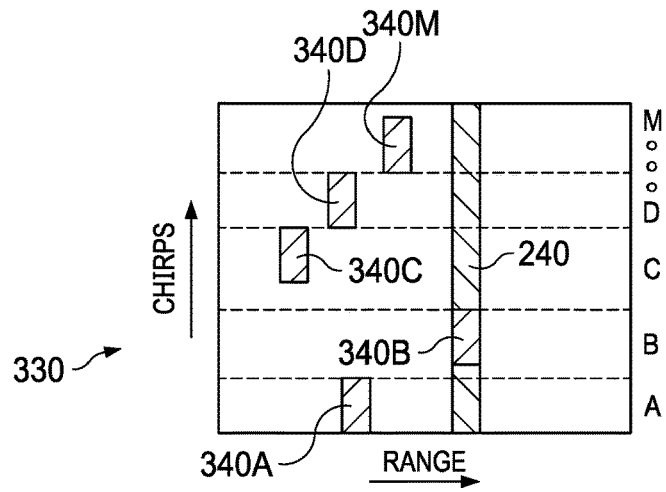
FIG. 3B illustrates an example representation of a range fast Fourier transform (FFT) for the intra-frame dithered chirp signals in the frame shown in FIG. 3A.

FIG. 3B illustrates an example representation 330 of a range FFT performed on the received signal corresponding to the transmission of the intra-frame dithered chirp signals 305A-M shown in FIG. 3A. Performing an FFT on received data corresponding to each chirp 305 resolves the received radar reflections into range bins. In addition to reflections from the transmitted chirp signals 305A-M, the received signal also includes the interfering chirp signals 310A-M. Because the interfering signals 310A-M have differing delays τ with respect to the corresponding chirp signal 305A-M, the interfering signals 310 appear as objects in different range bins 340A-M rather than the same range bin 240 as shown in FIG. 2B. Thus, the maximum number of cells per range bin affected by the interfering signals 310 is reduced compared to the undithered chirp signals 205 and shown in FIG. 2A. Techniques to detect and repair the affected cells are more effective on the reduced number of affected cells per range bin.

Figure 3C:
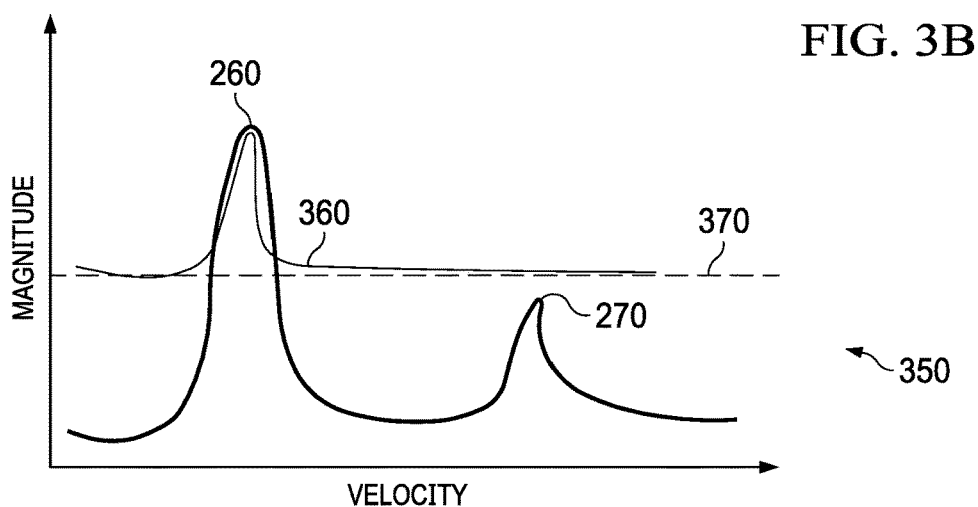
FIG. 3C illustrates a waveform of a Doppler FFT for the intra-frame dithered chirp signals in the frame shown in FIG. 3A.

FIG. 3C illustrates a waveform 350 of a Doppler FFT performed on a particular range bin from the range FFT of the chirps 305 in frame 300 shown in FIG. 3A. The particular range bin does not include the interfering signals 310. Since the inter-chirp timing varies across chirps 305 in frame 300, phase noise and a corresponding noise floor 370 are introduced into the Doppler FFT. The magnitude of the noise floor 370 relative to the peak value of the strong target 360 corresponds to an amount of chirp dithering. For example, more chirp dithering corresponds to a higher noise floor 370, while less chirp dithering corresponds to a lower noise floor 370. While the strong target is clearly visible in the Doppler FFT 360, the weak target 270 shown in the waveform 250 of the Doppler FFT for the chirps 205 is lower power than the noise floor 370 and obscured in the Doppler FFT for the intra-frame dithered chirps 305. Thus although intra-frame dithered chirps 305 reduce the maximum number of interference affected cells per range bin, the intra-frame dithering introduces a noise floor in the Doppler FFT that is present in all range bins, regardless of the presence or absence of interference in the particular range bin, and is not present with the undithered chirps 205.

Figure 4A:
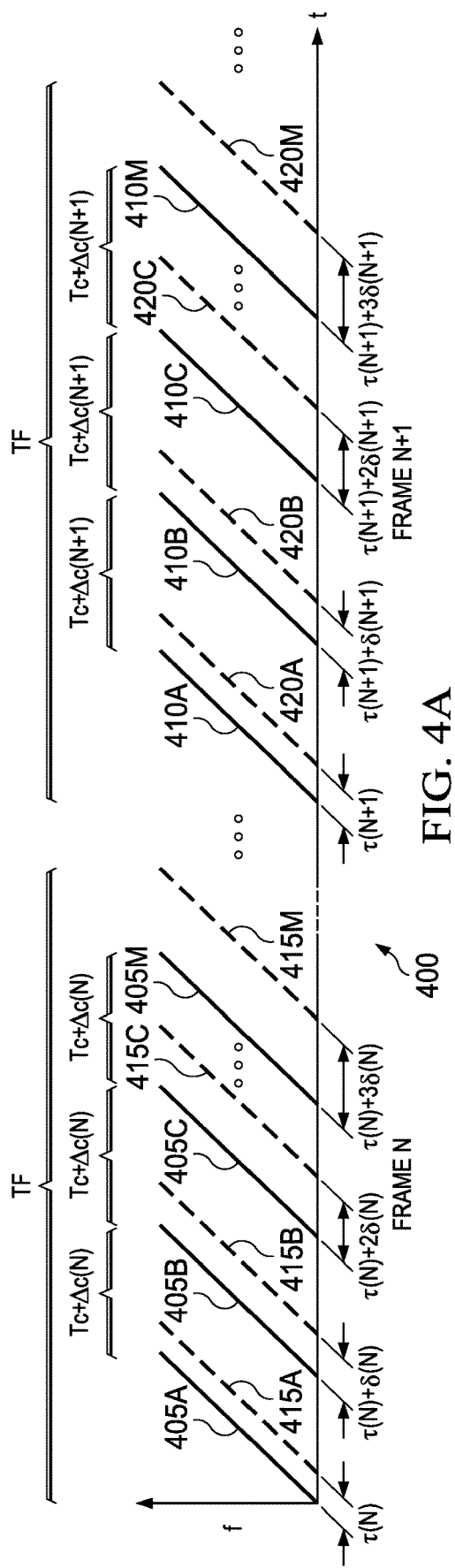
FIG. 4A illustrates waveforms of inter-frame dithered chirp signals in accordance with an example.

FIG. 4A illustrates waveforms 400 of inter-frame dithered chirp signals in accordance with an example. In a first frame N with a period TF, the inter-frame dithered chirp signals 405A-M are transmitted at fixed intervals based on the chirp period Tc and a first chirp dither Δc(N). Consider an interfering chirp signal 415 which also has inter-frame dithered chirp signals transmitted at fixed intervals based on the same chirp period Tc and a different chirp dither Δd(N). The difference δ(N) between the chirp dithers Δc(N) and Δd(N) causes the delay τ with respect to the corresponding inter-frame dithered chirp signal 405 to change across the frame N. For example, the interfering chirp signal 415A has an initial delay τ(N) with respect to the corresponding chirp signal 405A, the interfering chirp signal 415B has a second delay τ(N) plus δ(N) with respect to the corresponding chirp signal 405B, and the interfering chirp signal 415C has a third delay τ(N) plus two times δ(N) with respect to the corresponding chirp signal 405C. Here, δ(N) represents the difference in chirp dither between the chirp signals 405 and the interfering chirp signals 415 (i.e., δ(N)=Δd(N)−Δc(N)) and can be either positive or negative.

In the subsequent frame N+1 with the same period TF, the inter-frame dithered chirp signals 410A-M are transmitted at fixed intervals based on the chirp period Tc and a second chirp dither Δc(N+1). For an interfering chirp signal 420 with a different chirp dither Δd(N+1), the difference δ(N+1) between the chirp dithers Δc(N+1) and Δd(N+1) causes the delay τ with respect to the corresponding interframe dithered chirp signal 410 to change across the frame N+1. For example, the interfering chirp signal 420A has an initial delay τ(N+1) with respect to the corresponding chirp signal 410A, the interfering chirp signal 420B has a second delay τ(N+1) plus δ(N+1) with respect to the corresponding chirp signal 410B, and the interfering chirp signal 420C has a third delay τ(N+1) plus two times δ(N+1). The initial delay τ(N+1) for the frame N+1 may be the same or different from the initial delay τ(N) for the frame N.

The chirp dither Δc is fixed across chirps within a frame and varies across frames. Similar to the intra-frame dithered chirp signals 305 shown in FIG. 3A, the changing delay between the inter-frame dithered chirp signals 405 and the interfering chirp signals 415 and between the inter-frame dithered chirp signals 410 and the interfering chirp signals 420 causes the interfering signals 415 and 420 to appear as objects in different range bins, rather than a same range bin. The interchirp delay Tc+Δc(N) between sequential chirp signals 405 in the frame N and the interchirp delay Tc+Δc (N+1) between sequential chirp signals 410 in the frame N+1 are constant within each frame, and so there is no corruption in phase across chirps 405A-M and across chirps 410A-M, similar to the undithered chirp signals 205 shown in FIG. 2A.

Figure 4B:
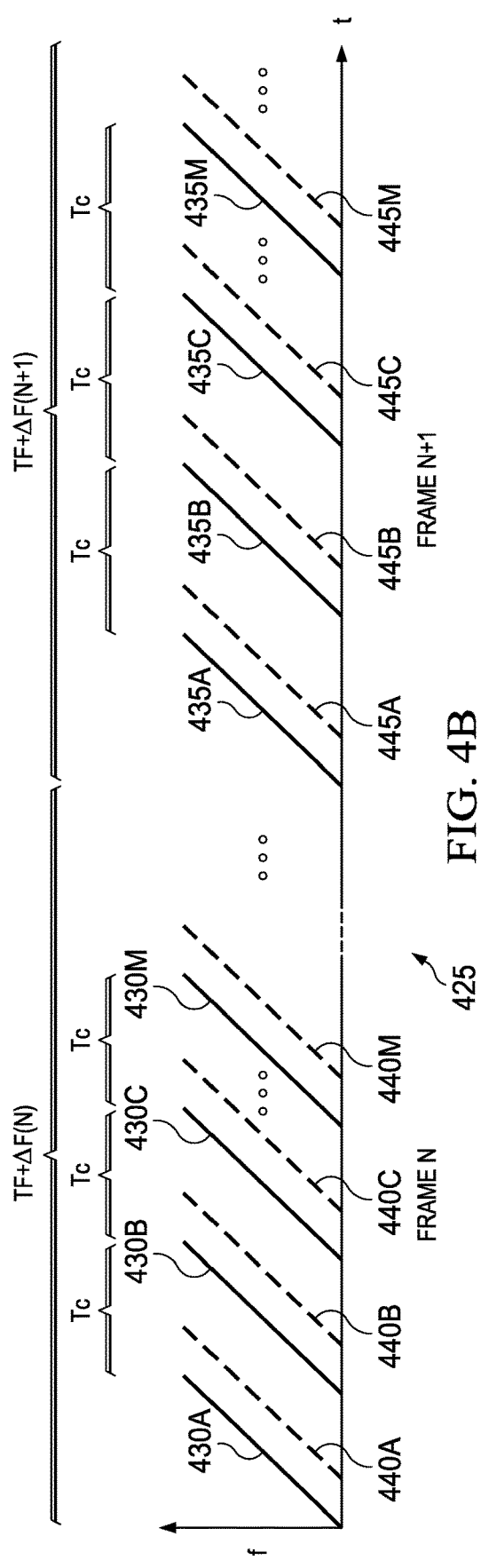
FIG. 4B illustrates waveforms of dithered frames of chirp signals in accordance with an example.

FIG. 4B illustrates waveforms 425 of dithered frames of chirp signals in accordance with an example. In a first frame N, the chirp signals 430A-M are transmitted at fixed intervals based on the chirp period Tc, and the period TF of the frame N is dithered with a frame dither ΔF(N), such that the length of time from the start of frame N to the start of frame N+1 is TF+ΔF(N). In a second frame N+1, the chirp signals 435A-M are transmitted at the same fixed intervals based on the chirp period Tc as in the first frame N, but the period TF of the frame N+1 is dithered with a second frame dither ΔF(N+1), such that the length of time from the start of frame N+1 to the start of frame N+2 is TF+ΔF(N+1). The frame dither does not affect the number or duration of chirps in each frame. Because the chirp signals 430 and 435 are transmitted at fixed intervals across the frames N and N+1, no phase noise or noise floor is introduced into the Doppler FFT. Frame dithering is often used in combination with inter-frame chirp dithering.

Figure 4C:
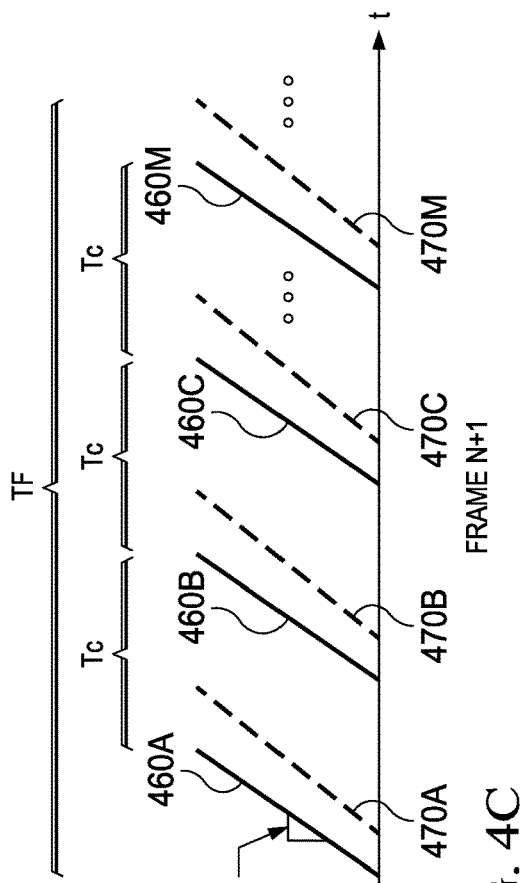
FIG. 4C illustrates waveforms of chirp signals with varying slopes in accordance with an example.

FIG. 4C illustrates waveforms 450 of chirp signals with dithered slopes in accordance with an example. In a first frame N with a period TF, the slope-dithered chirps 455A-M are transmitted at fixed intervals based on the chirp period Tc and have a slope S plus a first slope dither Ψ(N). For an interfering chirp signal 465, the first slope dither Ψ(N) causes the delay τ with respect to the corresponding slope-dithered chirp signal 455 to vary based on frequency. For example, the interfering chirp signal 465A has a sharper slope than the slope-dithered chirp signal 455A, and the delay τ is greater at lower frequencies than at higher frequencies.

In the subsequent frame N+1 with the same period TF, the slope-dithered chirps 460A-N are transmitted at fixed intervals based on the chirp period Tc and have a slope S plus a second slope dither Ψ(N+1). For an interfering chirp signal 470, the second slope dither Ψ(N+1) causes the delay τ with respect to the corresponding slope-dithered chirp signal 460 to vary based on frequency. For example, the slope-dithered chirp signal 460A has a sharper slope than the interfering chirp signal 470A, and the delay is greater at higher frequencies than at lower frequencies.

The changing delay between the slope-dithered chirp signals 455 and the interfering chirp signals 465 and between the slope-dithered chirp signals 460 and the interfering chirp signals 470 over the course of each chirp causes the interfering signals 465 and 470 to spread across different range bins, rather than a same range bin. The inter-chirp delay Tc between sequential chirp signals and the slope S+Ψ(N) of chirp signals 455 and 460 are constant within each frame, and so there is no corruption in phase across chirps 455A-M and across chirps 460A-M. The Doppler-FFT across chirps 455 in frame N and across chirps 460 in frame N+1 does not show a noise floor like the noise floor 370 shown in FIG. 3C.

Figure 4D:
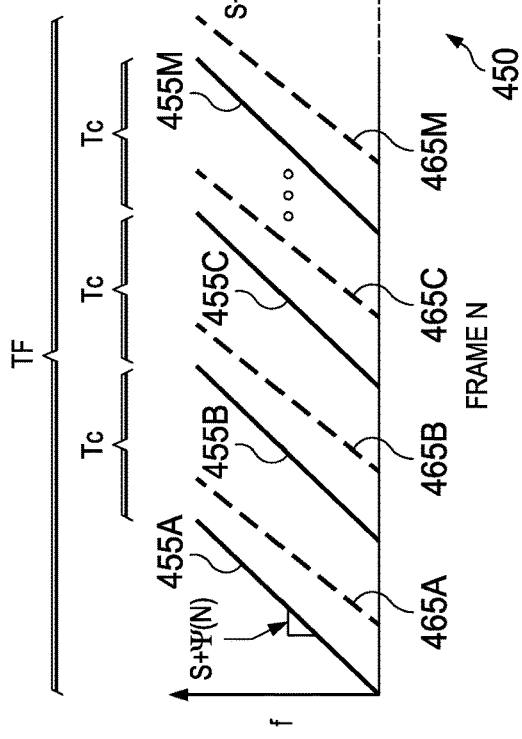
FIG. 4D illustrates waveforms of dithered frames of inter-frame dithered chirp signals with varying slopes in accordance with the examples shown in FIGS. 4A, 4B, and 4C.
Figure 4D:
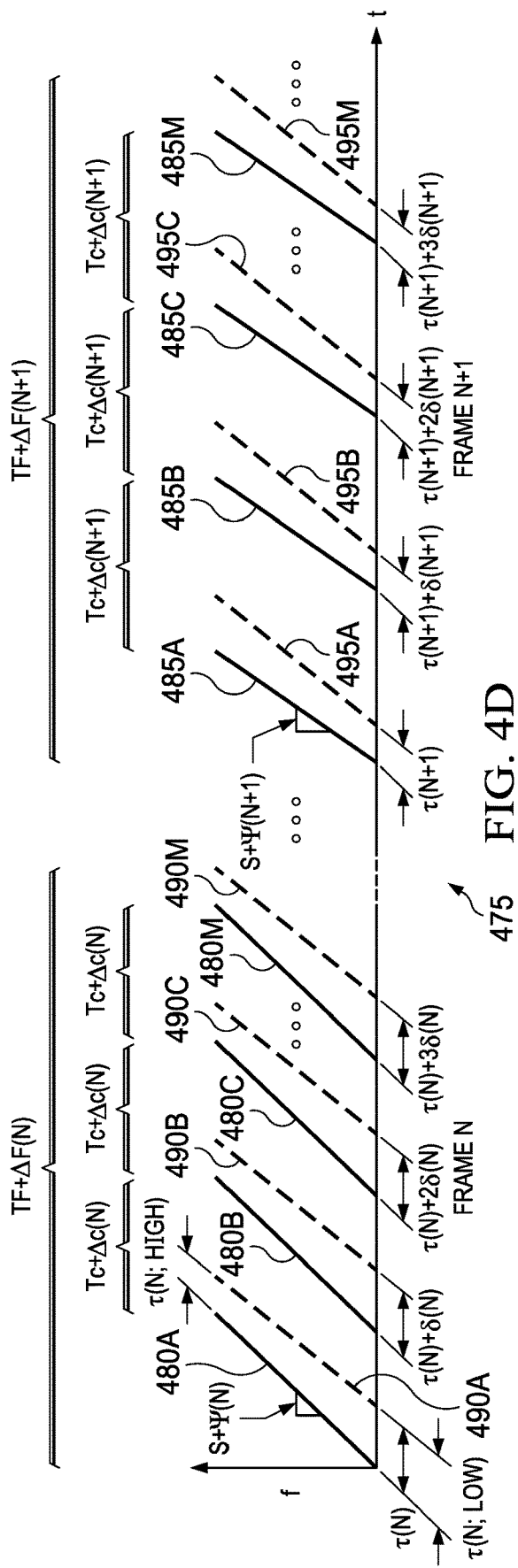

The inter-frame dithering, frame dithering, and slope dithering techniques described in FIG. 4A, FIG. 4B, and FIG. 4C, respectively, can be used in combination with one or more of the other techniques to further reduce the number of cells per range bin affected by the interfering chirp signals and to further reduce the amount of phase noise and the magnitude of the corresponding noise floor introduced into the Doppler FFT. FIG. 4D illustrates waveforms 475 of dithered frames of inter-frame dithered chirp signals with varying slopes in accordance with the examples shown in FIGS. 4A, 4B, and 4C.

In a first frame N, the inter-frame and slope-dithered chirps signals 480A-M are transmitted at fixed intervals based on the chirp period Tc and a first chirp dither Δc(N) and have a slope S plus a first slope dither Ψ(N). The period TF of the frame N is dithered with a frame dither ΔF(N). For an interfering chirp signal 490, the first chirp dither Δc(N) and the first slope dither Ψ(N) cause the delay τ with respect to the corresponding inter-frame and slope-dithered chirp signal 480 to vary across the corresponding chirp signal 480 and to increase across the frame N.

For example, the interfering chirp signal 490A has an initial delay τ(N; low) with respect to the low frequencies of the corresponding chirp signal 480A and an initial delay τ(N; high) with respect to the high frequencies of the corresponding chirp signal 480A. The interfering chirp signal 490B has a second delay τ(N; low) plus δ(N) with respect to the low frequencies of the corresponding chirp signal 480B and a second delay τ(N; high) plus δ(N) with respect to the high frequencies of the corresponding chirp signal 480B. The interfering chirp signal 490C has a third delay τ(N; low) plus two times δ(N) with respect to the low frequencies of the corresponding chirp signal 480C and a third delay τ(N; high) plus two times δ(N) with respect to the high frequencies of the corresponding chirp signal 480C.

In the second frame N+1, the inter-frame and slope-dithered chirps signals 485A-N are transmitted at fixed intervals based on the chirp period Tc and a second chirp dither Δc(N+1) and have a slope S plus a second slope dither Ψ(N+1). The period TF of the frame N+1 is dithered with a second frame dither ΔF(N+1). For an interfering chirp signal 495, the second time dither Δc(N+1) and the second slope dither Ψ(N+1) cause the delay τ with respect to the corresponding inter-frame and slope-dithered chirp signal 485 to vary across the corresponding chirp signal 485 and to increase across the frame N+1.

For example, the interfering chirp signal 495A has an initial delay τ(N+1; low) with respect to the low frequencies of the corresponding chirp signal 485A and an initial delay τ(N+1; high) with respect to the high frequencies of the corresponding chirp signal 485A. The interfering chirp signal 495B has a second delay τ(N+1; low) plus δ(N+1) with respect to the low frequencies of the corresponding chirp signal 485B and a second delay τ(N+1; high) plus δ(N+1) with respect to the high frequencies of the corresponding chirp signal 485B. The interfering chirp signal 495C has a third delay τ(N+1; low) plus two times δ(N+1) with respect to the low frequencies of the corresponding chirp signal 485C and a third delay τ(N+1; high) plus two times δ(N+1) with respect to the high frequencies of the corresponding chirp signal 485C.

The combination of inter-frame and slope dithering causes the delay between the interfering signals 490 and 495 and the corresponding chirp signals 480 and 485 to vary across a single chirp and across the frames N and N+1. Thus, the interfering signals 490 and 495 appear as objects in different range bins, rather than a same range bin, and affect fewer cells in any one range bin than the interfering signals 415 and 420 shown in FIG. 4A, the interfering signals 440 and 445 shown in FIG. 4B, and the interfering signals 465 and 470 shown in FIG. 4C. Techniques to detect and repair the affected cells are more effective on the reduced number of affected cells.

Both the inter-chirp delays and the slopes are constant within each frame. For example in frame N, the inter-chirp delay Tc+Δc(N) and the slope S+Ψ(N) are constant, and in frame N+1, the inter-chirp delay Tc+Δc(N+1) and the slope S+Ψ(N+1) are constant. Thus, there is no corruption in phase across chirps 480A-M in frame N or across chirps 485A-M in frame N+1. The Doppler-FFT across chirps 480A-M in frame N or across chirps 485A-M does not show a noise floor like the noise floor 370 shown in FIG. 3C.

Figure 5:
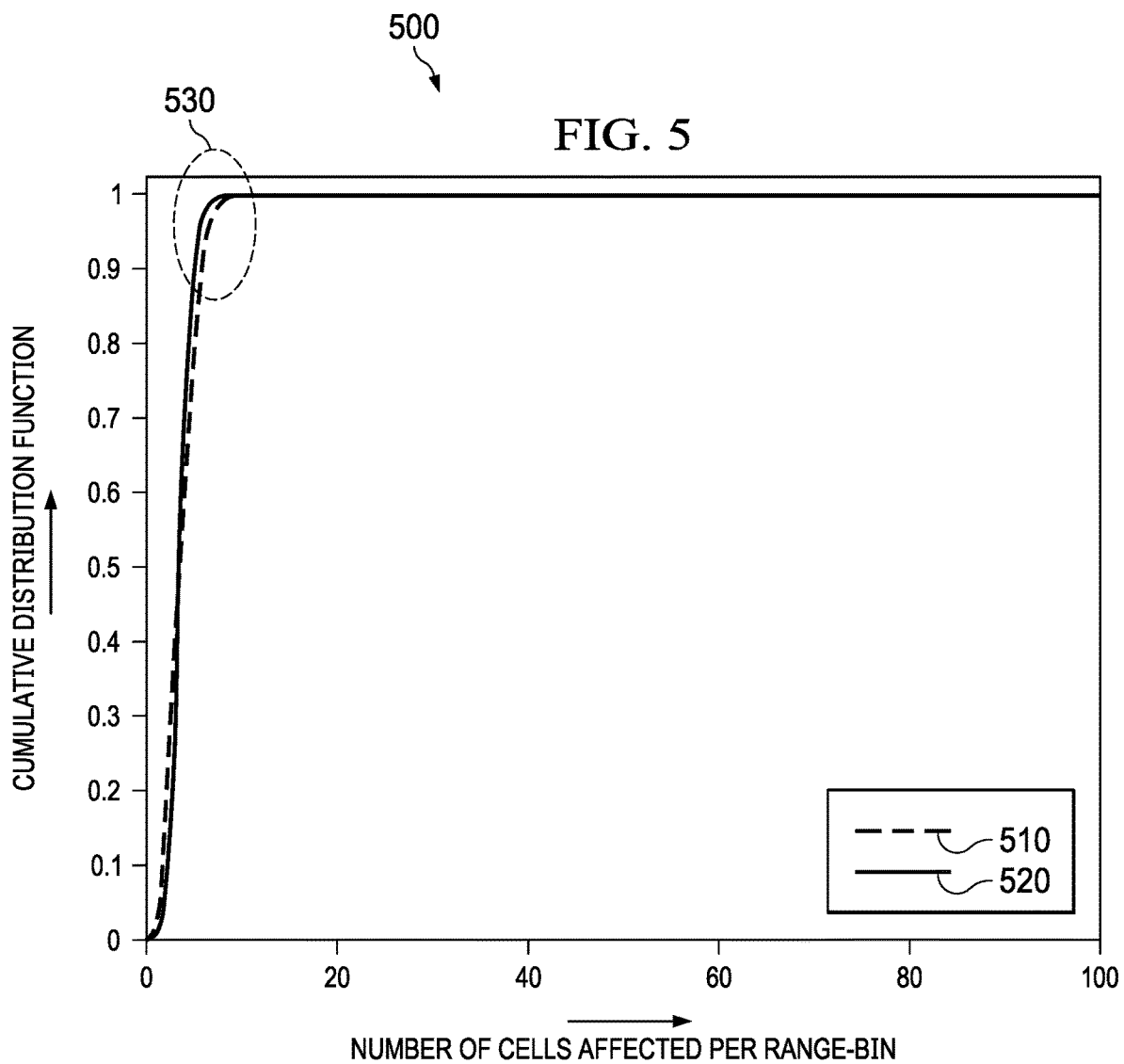
FIG. 5 illustrates a graph of the cumulative distribution function of the number of cells per range bin that are affected by an interfering signal.

FIG. 5 illustrates a graph 500 of the cumulative distribution function of the number of cells per range bin that are affected by an interfering signal. The cumulative distribution function is an indication of how well a particular dithering technique spreads the interfering chirp signals across range bins. In this example, a frame of 256 chirps were transmitted in a frame period TF of approximately 6.4 milliseconds with a chirp period Tc of approximately 25 microseconds. 20 interfering radar systems were used to compare the cumulative distribution function 520 for an inter-frame dithering technique with a dither of plus or minus one microsecond and the cumulative distribution function 510 for an intra-frame dithering technique with a dither of plus or minus 3.75 microseconds. As shown in callout 530, the cumulative distribution function 520 for the inter-frame dithering technique discussed herein with respect to FIG. 4A is substantially the same as the cumulative distribution function 510 for the intra-frame dithering technique discussed herein with respect to FIG. 3A. While the inter-frame and intra-frame dithering techniques may have substantially the same improvements with respect to interference mitigation in the range FFT, that is, the number of cells per range bin affected by the interference signals, the inter-frame dithering technique introduces less phase noise and a lower corresponding noise floor into the Doppler FFT than the intra-frame dithering technique.

Figure 6:
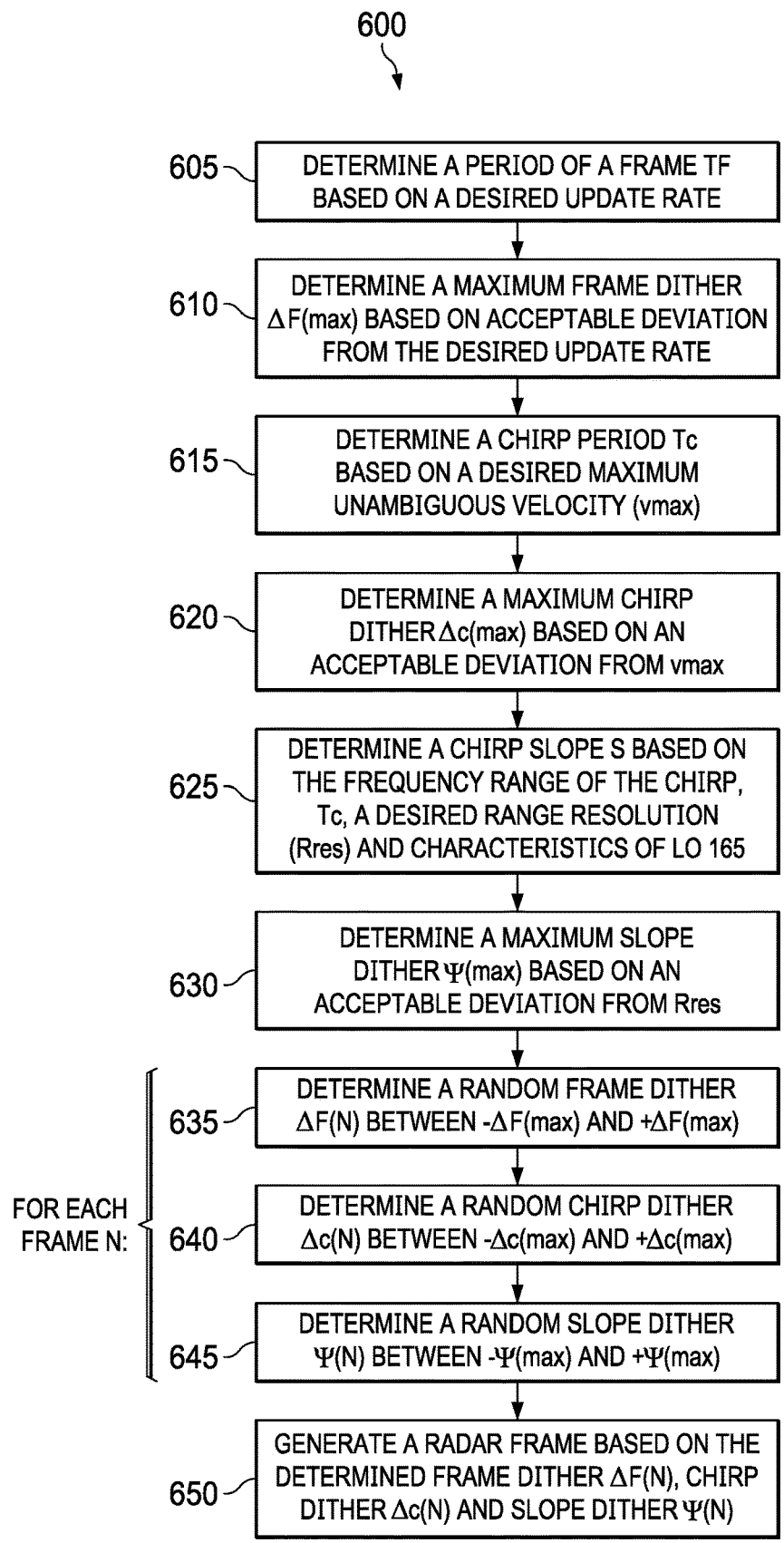
FIG. 6 illustrates, in flowchart form, an example process for dithering radar frames in accordance with an example.

FIG. 6 illustrates, in flowchart form, an example process 600 for dithering radar frames according to an example. The process 600 is performed by a processing unit executing instructions stored in a non-transitory computer-readable medium such as a static random access memory (SRAM). For example, the process 600 can be performed by the chirp controller 120 executing instructions stored in storage 150 shown in FIG. 1. The process 600 begins at step 605, where the chirp controller 120 determines a period of a frame TF based on a desired update rate for the radar system 100. For example, if the desired update rate for the radar system 100 is 60 frames per second, the frame period TF is approximately 17 milliseconds (ms).

At step 610, the chirp controller 120 determines a maximum frame dither ΔF(max) based on an acceptable deviation α(F) from the desired update rate. That is, the maximum frame dither ΔF(max) can be set to α(F) times the frame period TF. Returning to the previous example, if a deviation α(F) of plus or minus 5% from the desired update rate is acceptable, then the maximum frame dither ΔF(max) can be set to approximately one ms. At step 615, the chirp controller 120 determines a chirp period Tc based on a desired maximum unambiguous velocity vmax for the radar system 100. For example, the chirp period Tc may be represented as:

$$Tc = \frac{\lambda}{4vmax}$$

where λ represents a wavelength of the chirp.

At step 620, the chirp controller 120 determines a maximum chirp dither Δc(max) based on an acceptable deviation α(c) from the desired maximum unambiguous velocity vmax. That is, the maximum chirp dither Δc(max) can be set to α(c) times the chirp period Tc. For example, if a deviation α(c) of plus or minus 2% from the desired maximum unambiguous velocity vmax is acceptable, then the maximum chirp dither Δc(max) can be set to approximately 0.02Tc.

At step 625, the chirp controller 120 determines a chirp slope S based on the frequency range of the chirp, the chirp period Tc, the desired range resolution, and characteristics of the LO 165. For example, the chirp slope S may be determined as:

$$S = \frac{c}{2(Tc)(Rres)}$$

where c represents the speed of light and Rres represents the desired range resolution. Additionally, the chirp slope S may be adjusted based on the characteristics of the LO 165 such that the LO 165 can consistently and efficiently generate chirps with the appropriate slope S. At step 630, the chirp controller 120 determines a maximum slope dither Ψ(max) based on an acceptable deviation α(r) from the desired range resolution. That is, the maximum slope dither Ψ(max) can be set to α(r) times the chirp slope S.

For each radar frame N, the chirp controller 120 performs one or more of steps 635, 640, and 645, and step 650. At step 635, the chirp controller 120 determines a random frame dither ΔF(N) between negative ΔF(max) and positive ΔF(max). At step 640, the chirp controller 120 determines a random chirp dither Δc(N) between negative Δc(max) and positive Δc(max). At step 645, the chirp controller 120 determines a random slope dither Ψ(N) between negative Ψ(max) and positive Ψ(max). At step 650, the chirp controller 120 causes LO 165 in radar sensor circuit 160 to generate a radar frame based on the one or more determined frame dither ΔF(N), chirp dither Δc(N), and slope dither Ψ(N).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include additional or different components to provide functionality at least partially similar to functionality available prior to the component replacement. Unless otherwise stated, "about," "approximately," or "substantially" preceding a value means+/−10 percent of the stated value. Modifications are possible in the described examples, and other examples are possible within the scope of the claims.

Modifications are possible in the described embodiments, and other embodiments are possible, within the scope of the claims.

What is claimed is:

1. A non-transitory computer-readable storage device storing machine instructions which, when executed by one or more processors, cause the one or more processors to:
   determine a chirp period Tc for radar chirps in a radar frame;
   determine a maximum chirp dither $\Delta c(max)$;
   determine a chirp slope S for the radar chirps in the radar frame;
   determine a maximum slope dither $\Psi(max)$;
   determine, for a radar frame N, at least one of:
      a random chirp dither $\Delta c(N)$ between negative $\Delta c(max)$ and positive $\Delta c(max)$, and
      a random slope dither $\Psi(N)$ between negative $\Psi(max)$ and positive $\Psi(max)$; and
   cause a radar sensor circuit to generate the radar chirps in the radar frame N based on the chirp period Tc, the chirp slope S, and the at least one of the random chirp dither $\Delta c(N)$ and the random slope dither $\Psi(N)$.

2. The storage device of claim 1, wherein the machine instructions to cause the radar sensor circuit to generate the radar chirps in the radar frame N cause the one or more processors to cause the radar sensor circuit to transmit a plurality of radar chirps having the chirp slope S plus the random slope dither $\Psi(N)$.

3. The storage device of claim 1, wherein the machine instructions to cause the radar sensor circuit to generate the radar chirps in the radar frame N cause the one or more processors to cause the radar sensor circuit to transmit a plurality of radar chirps at intervals equal to the chirp period Tc plus the random chirp dither $\Delta c(N)$.

4. The storage device of claim 1, further comprising machine instructions which, when executed by the one or more processors, cause the one or more processors to:
   determine a period TF for a radar frame;
   determine a maximum frame dither $\Delta F(max)$;
   determine, for the radar frame N, a random frame dither $\Delta F(N)$ between negative $\Delta F(max)$ and positive $\Delta F(max)$; and
   cause the radar sensor circuit to generate the radar frame N further based on the period TF and the random frame dither $\Delta F(N)$.

5. The storage device of claim 4, wherein the period TF for the radar frame is based on an update rate and the maximum frame dither $\Delta F(max)$ is based on a threshold deviation from the update rate.

6. The storage device of claim 4, wherein the machine instructions to cause the radar sensor circuit to generate the radar chirps in the radar frame N cause the one or more processors to cause the radar sensor circuit to transmit a plurality of radar chirps during the period TF plus the random frame dither $\Delta F(N)$.

7. The storage device of claim 4, further comprising machine instructions which, when executed by the one or more processors, cause the one or more processors to:
   determine, for a subsequent radar frame N+1, a subsequent random frame dither $\Delta F(N+1)$ between negative $\Delta F(max)$ and positive $\Delta F(max)$; and
   cause the radar sensor circuit to generate radar chirps in the subsequent radar frame N+1 further based on the period TF and the subsequent random frame dither $\Delta F(N+1)$.

8. The storage device of claim 7, wherein the subsequent random frame dither $\Delta F(N+1)$ is not equal to the random frame dither $\Delta F(N)$.

9. The storage device of claim 1, further comprising machine instructions which, when executed by the one or more processors, cause the one or more processors to:
   determine, for a subsequent radar frame N+1, at least one of:
      a subsequent random chirp dither $\Delta c(N+1)$ between negative $\Delta c(max)$ and positive $\Delta c(max)$, and
      a subsequent random slope dither $\Psi(N+1)$ between negative $\Psi(max)$ and positive $\Psi(max)$; and
   cause the radar sensor circuit to generate radar chirps in the subsequent radar frame N+1 based on the chirp period Tc, the chirp slope S, and the at least one of the subsequent random chirp dither $\Delta c(N+1)$ and the subsequent random slope dither $\Psi(N+1)$.

10. The storage device of claim 9, wherein the subsequent random chirp dither $\Delta c(N+1)$ is not equal to the random chirp dither $\Delta c(N)$.

11. The storage device of claim 9, wherein the subsequent random slope dither $\Psi(N+1)$ is not equal to the random slope dither $\Psi(N)$.

12. The storage device of claim 1, wherein the chirp period Tc for the radar chirp is based on a threshold unambiguous velocity and the maximum chirp dither $\Delta c(max)$ is based on a threshold deviation from the threshold unambiguous velocity.

13. The storage device of claim 1, wherein the chirp slope S is based on a frequency range of radar chirps in the radar frame, a threshold range resolution, and the chirp period Tc, and wherein the maximum slope dither $\Psi(max)$ is based on a threshold deviation from the threshold range resolution.

14. An apparatus, comprising:
   one or more processors; and
   one or more non-transitory computer-readable media storing machine instructions which, when executed by the one or more processors, cause the one or more processors to:
      determine at least one of a chirp period Tc for radar chirps in a radar frame and a chirp slope S for radar chirps in the radar frame;

in response to determining the chirp period Tc:
  determine a maximum chirp dither $\Delta c(max)$;
  determine, for a radar frame N, a random chirp dither $\Delta c(N)$ between negative $\Delta c(max)$ and positive $\Delta c(max)$;
in response to determining the chirp slope S:
  determine a maximum slope dither $\Psi(max)$; and
  determine, for the radar frame N, a random slope dither $\Psi(N)$ between negative $\Psi(max)$ and positive $\Psi(max)$; and
cause a radar sensor circuit to generate radar chirps in the radar frame N based on the at least one of (1) the chirp period Tc and the random chirp dither $\Delta c(N)$, and (2) the chirp slope S and the random slope dither $\Psi(N)$.

15. The apparatus of claim 14, wherein the one or more non-transitory computer-readable media further comprise machine instructions which, when executed by the one or more processors, cause the one or more processors to:
  determine a period TF for the radar frame;
  determine a maximum frame dither $\Delta F(max)$; and
  determine, for the radar frame N, a random frame dither $\Delta F(N)$ between negative $\Delta F(max)$ and positive $\Delta F(max)$, wherein the machine instructions to cause the radar sensor circuit to generate the radar chirps in the radar frame N cause the one or more processors to cause the radar sensor circuit to generate the radar chirps in the radar frame N based on the period TF and the random frame dither $\Delta F(N)$.

16. The apparatus of claim 15, wherein the one or more non-transitory computer-readable media further comprise machine instructions which, when executed by the one or more processors, cause the one or more processors to:
  determine, for a subsequent radar frame N+1, a subsequent random frame dither $\Delta F(N+1)$ between negative $\Delta F(max)$ and positive $\Delta F(max)$; and
  cause the radar sensor circuit to generate radar chirps in the subsequent radar frame N+1 based on the period TF and the subsequent random frame dither $\Delta F(N+1)$.

17. The apparatus of claim 16, wherein the subsequent random frame dither $\Delta F(N+1)$ is not equal to the random frame dither $\Delta F(N)$.

18. The apparatus of claim 14, wherein the one or more non-transitory computer-readable media further comprise machine instructions which, when executed by the one or more processors, cause the one or more processors to:
  determine, for a subsequent radar frame N+1, at least one of a subsequent random chirp dither $\Delta c(N+1)$ between negative $\Delta c(max)$ and positive $\Delta c(max)$ and a subsequent random slope dither $\Psi(N)$ between negative $\Psi(max)$ and positive $\Psi(max)$; and
  cause the radar sensor circuit to generate radar chirps in the subsequent radar frame N+1 based on the at least one of the chirp period Tc and the subsequent random chirp dither $\Delta c(N+1)$ and the chirp slope S and the subsequent random slope dither $\Psi(N+1)$.

19. The apparatus of claim 18, wherein:
  the subsequent random chirp dither $\Delta c(N+1)$ is not equal to the random chirp dither $\Delta c(N)$; and
  the subsequent random slope dither $\Psi(N+1)$ is not equal to the random slope dither $\Psi(N)$.

20. The apparatus of claim 14, further comprising the radar sensor circuit.

21. A method for dithering radar frames, comprising:
  determining at least one of a chirp period Tc for radar chirps in a radar frame and a chirp slope S for radar chirps in the radar frame;
  in response to determining the chirp period Tc:
    determining a maximum chirp dither $\Delta c(max)$;
    determining, for a radar frame N, a random chirp dither $\Delta c(N)$ between negative $\Delta c(max)$ and positive $\Delta c(max)$;
  in response to determining the chirp slope S:
    determining a maximum slope dither $\Psi(max)$; and
    determining, for the radar frame N, a random slope dither $\Psi(N)$ between negative $\Psi(max)$ and positive $\Psi(max)$; and
  causing a radar sensor circuit to generate radar chirps in the radar frame N based on the at least one of (1) the chirp period Tc and the random chirp dither $\Delta c(N)$ and (2) the chirp slope S and the random slope dither $\Psi(N)$.

22. The method of claim 21, wherein the chirp period Tc for the radar chirps is based on a threshold unambiguous velocity associated with the radar sensor circuit, and wherein the maximum chirp dither $\Delta c(max)$ is based on a threshold deviation from the threshold unambiguous velocity.

23. The method of claim 21, further comprising:
  determining a period TF for the radar frame;
  determining a maximum frame dither $\Delta F(max)$; and
  determining, for the radar frame N, a random frame dither $\Delta F(N)$ between negative $\Delta F(max)$ and positive $\Delta F(max)$, wherein causing the radar sensor circuit to generate the radar chirps in the radar frame N comprises causing the radar sensor circuit to generate the radar chirps in the radar frame N based on the period TF and the random frame dither $\Delta F(N)$.

24. The method of claim 23, wherein the period TF for the radar frame is based on an update rate associated with the radar sensor circuit, and wherein the maximum frame dither $\Delta F(max)$ is based on a threshold deviation from the update rate.

25. The method of claim 21, wherein the chirp slope S is based on a frequency range of radar chirps in the radar frame, a threshold range resolution, and the chirp period Tc, and wherein the maximum slope dither $\Psi(max)$ is based on a threshold deviation from the threshold range resolution.

* * * * *